United States Patent [19]

Jung

[11] Patent Number: 5,765,413
[45] Date of Patent: Jun. 16, 1998

[54] GEAR SHIFT LEVER WITH A BUTTON LOCK

[76] Inventor: Teng Wei Jung, 5F-23, 70, Fu-Shing Road, Taoyuan, Taiwan

[21] Appl. No.: 922,009

[22] Filed: Sep. 2, 1997

[51] Int. Cl.$^6$ ............................................ B60R 25/06
[52] U.S. Cl. ............................ 70/201; 70/247; 70/360; 74/473.24
[58] Field of Search ................ 70/201, 245–248, 70/217, 251, 360, 361, 181, 187, 195, 197; 74/473.24, 473.25, 538

[56] References Cited

U.S. PATENT DOCUMENTS

| | | | |
|---|---|---|---|
| 962,448 | 6/1910 | Miller | 70/195 |
| 1,198,341 | 9/1916 | Geery | 70/360 |
| 4,231,241 | 11/1980 | Lipski | 74/538 X |
| 4,747,278 | 5/1988 | Roncelli et al. | 70/201 |
| 5,134,764 | 8/1992 | Taylor | 70/360 X |
| 5,329,792 | 7/1994 | Lee | 70/201 |
| 5,490,403 | 2/1996 | Bianco, Sr. | 70/247 X |
| 5,546,775 | 8/1996 | Lee | 70/201 |
| 5,596,894 | 1/1997 | Lee | 70/201 |

*Primary Examiner*—Lloyd A. Gall
*Attorney, Agent, or Firm*—Bacon & Thomas

[57] ABSTRACT

A gear shift lever including lever body, a knob mounted on a top end of the lever body, a control rod mounted in the lever body, a button mounted in a recessed chamber of the knob and depressed to force down the control rod for permitting the lever body to be shifted, and a button lock unit controlled to lock the button, wherein the button lock unit includes a stop member mounted inside the recessed chamber and having a forwardly extended projecting rod inserted into a longitudinal groove of the button, a spring connected between the stop member and the button to impart an outward pressure to the button, and a lock mounted in the button and turned with the key to move a stop rod in and out of the longitudinal groove of the button, the stop rod being stopped against the projecting rod of the stop member to lock the button when it is moved into the longitudinal groove of the button, the stop rod being disengaged from the projecting rod of the stop member to unlock the button when it is moved out of the longitudinal groove of the button.

1 Claim, 5 Drawing Sheets

GEAR SHIFT LEVER WITH A BUTTON LOCK

BACKGROUND OF THE INVENTION

The present invention relates to gear shift levers for motor vehicles, and more particularly to such a gear shift lever which has a button lock for locking its operation control button.

A regular gear shift lever is generally comprised of a lever body, a knob mounted on a top end of the lever body, the knob having a recessed chamber at one side, a control rod mounted in the lever body, a button mounted in the recessed chamber of the knob and depressed to force down the control rod for permitting said lever body to be shifted. There are also know various gear shift lever locks adapted for locking a gear shift lever of a motor vehicle. These gear shift lever locks are commonly designed to lock the lever body of the gear shift lever.

SUMMARY OF THE INVENTION

It is the main object of the present invention to provide a gear shift lever which is equipped with a lock on the inside for locking its control button. A gear shift lever in accordance with the present invention comprises a lever body, a knob mounted on a top end of the lever body, the knob having a recessed chamber at one side, a control rod mounted in the lever body, a button mounted in the recessed chamber and depressed to force down the control rod for permitting the lever body to be shifted, and a button lock unit controlled to lock the button, wherein the button comprises a longitudinal groove and a transverse slot intersected with the longitudinal groove; the button lock unit comprises a stop member mounted inside the recessed chamber, the stop member comprising a base and a projecting rod forwardly and perpendicularly extended from the base, a spring connected between the base of the stop member and a rear end of the button and imparting an outward pressure to the button, the projecting rod of the stop member being inserted into the longitudinal groove of the button, a core mounted in an axial hole in the button, a plug head fixedly connected to one end of the core and disposed outside the button for turning with a key, and a stop rod fixedly and perpendicularly extended from one end of the core remote from the plug head and inserted into the transverse slot of the button. The stop rod is moved into the longitudinal groove of the button and stopped against the projecting rod of the stop member to lock the button when the plug head is turned with the key in one direction. The stop rod is moved away from the longitudinal groove of the button to unlock the button when the plug head is turned with the key in the reversed direction.

DETAILED DESCRIPTION OF THE PREFERRED EMBODIMENT

Figure 1:
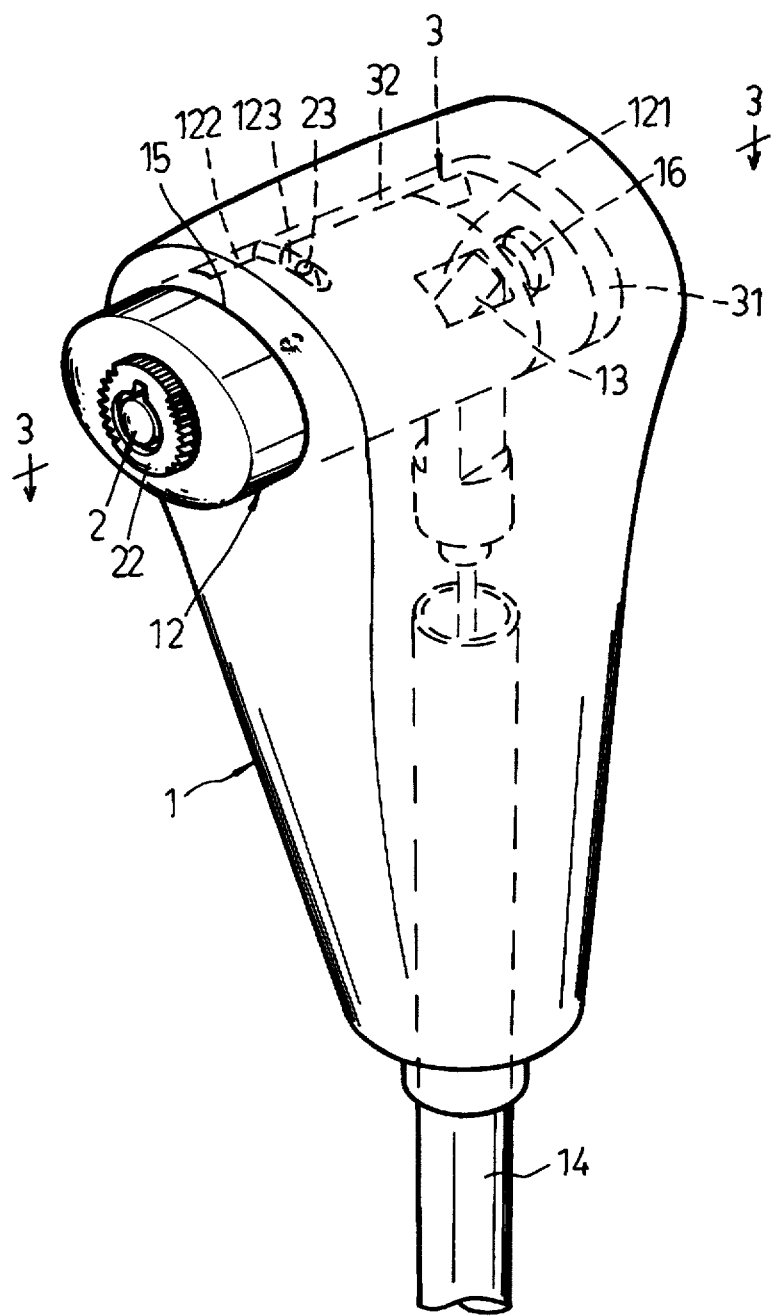
FIG. 1 is a perspective view of the present invention, showing the button unlocked.
Figure 2:
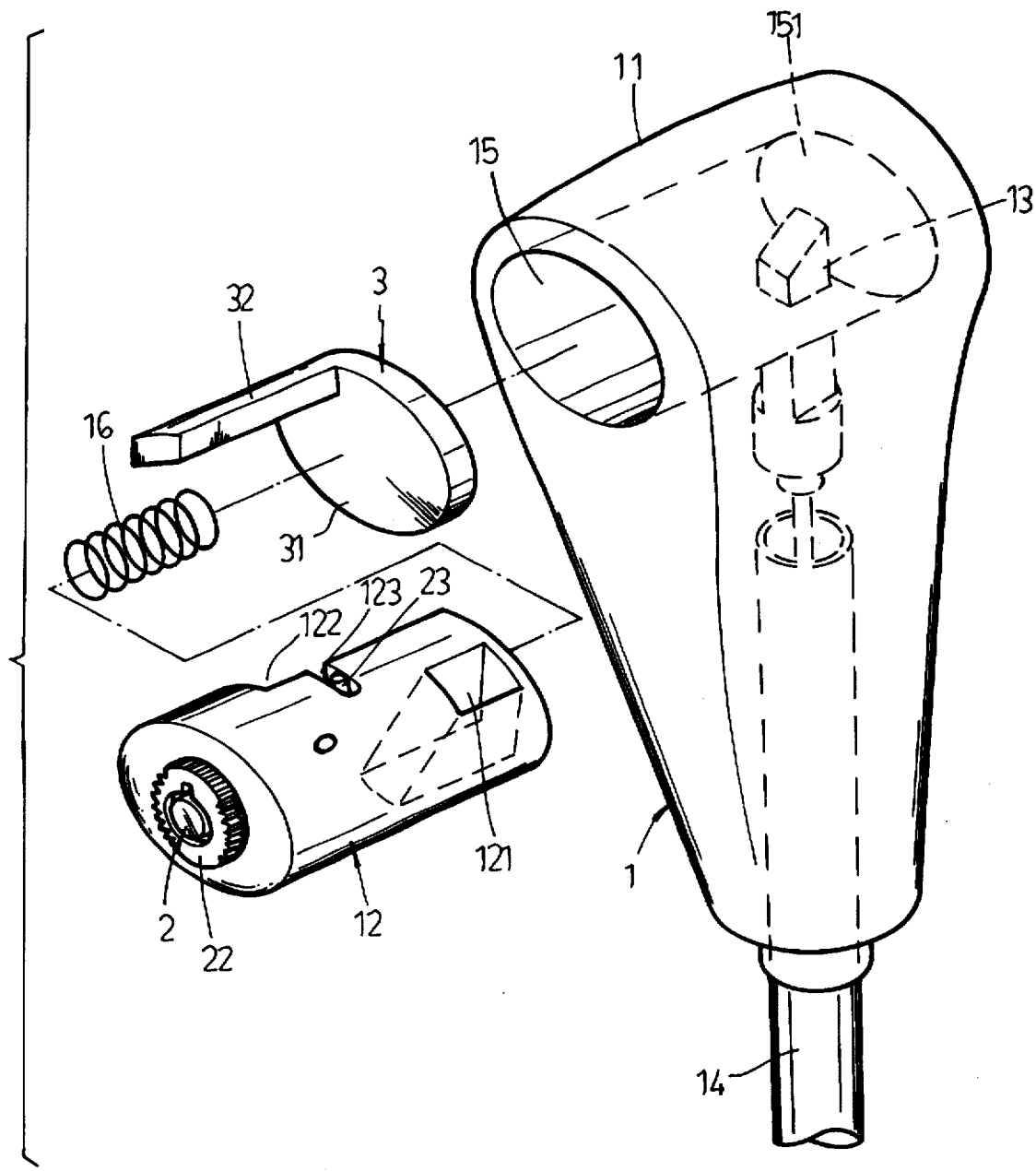
FIG. 2 is an exploded view of the assembly shown in FIG. 1.

Referring to Figures from 1 to 3, a gear shift lever 1 comprises a knob 11, a button 12, a control rod 13, a lever body 14, a recessed chamber 15, and a spring 16. The button 12 comprises a driving portion 121. The driving portion 121 is moved with the button 12 in the recessed chamber 15 to force down the control rod 13, enabling the gear shift lever 1 to be shifted. A lock 2 is mounted in the button 12. A stop member 3 is mounted inside the recessed chamber 15 and closely attached to the bottom wall 151 of the recessed chamber 15. The stop member 3 comprises a circular base 31 fitting the recessed chamber 15, and a projecting rod 32 perpendicularly raised from one side of the circular base 31 at the border. A spring 16 is connected between the circular base 31 of the stop member 3 and a bottom side of the button 12. The bottom 12 comprises a longitudinal groove 122 which receives the projecting rod 32 of the stop member 3, and a transverse slot 123 intersected with the longitudinal groove 122. The lock 2 comprises a plug head 22, a core 21 fixedly connected to the plug head 22 and turned with the plug head 22 in an axial hole in the button 12, and a stop rod 23 perpendicularly connected to the core 21 at its rear end and inserted through the transverse slot 123.

Figure 3:
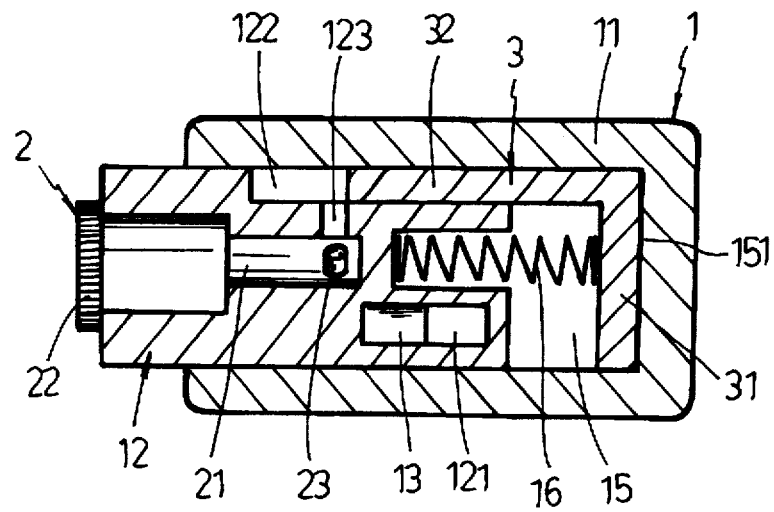
FIG. 3 is a sectional view taken along line 3—3 of FIG. 1.
Figure 4:
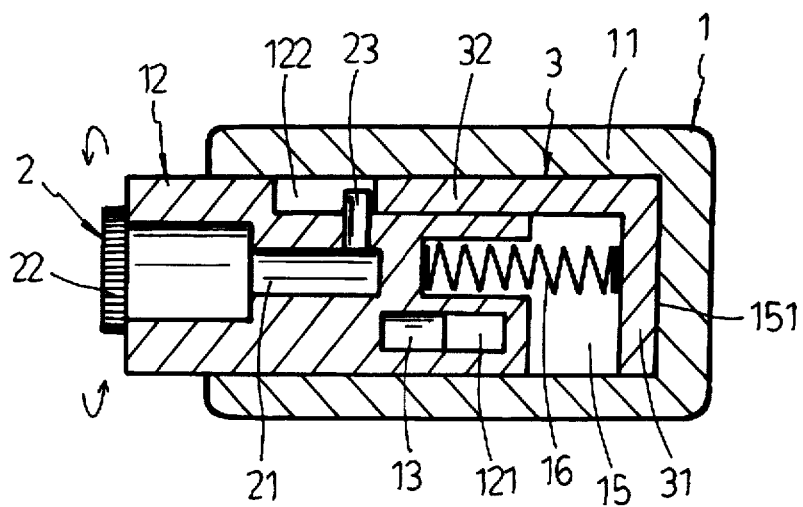
FIG. 4 is similar to FIG. 3 but showing the button locked.

Referring to FIGS. 3 and 4, when the stop member 3 is inserted into the recessed chamber 15, the circular base 31 is closely attached to the bottom wall 151 of the recessed chamber 15, and then the spring 16 and the button 12 are inserted into the recessed chamber 15 in proper order, permitting the projecting rod 32 of the stop member 3 to be inserted into the longitudinal groove 122 of the button 12. When the button 12 is not depressed as shown in FIG. 3, the projecting rod 32 of the stop member 3 does not pass into the connecting space between the longitudinal groove 122 and the transverse slot 123, thus the plug head 22 can be turned to move the stop rod 23 of the lock 2 along the transverse slot 123 into the longitudinal groove 122 (see FIG. 4). When the stop rod 23 is moved into the longitudinal groove 122, it is stopped against the projecting rod 32 of the stop member 3, and therefore the button 12 cannot be depressed.

Figure 5:
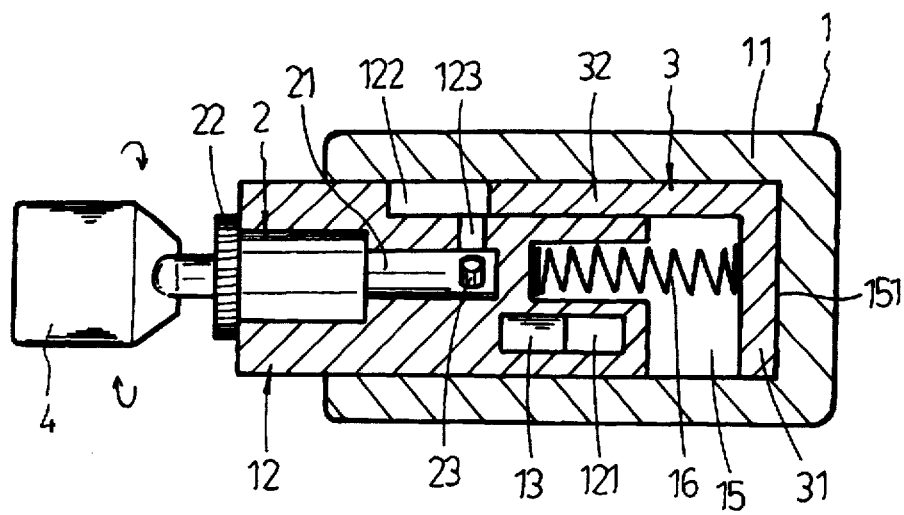
FIG. 5 is another sectional view of the present invention, showing the cylinder turned in the reversed direction and the stop rod of the lock disengaged from the projecting rod of the stop member.
Figure 6:
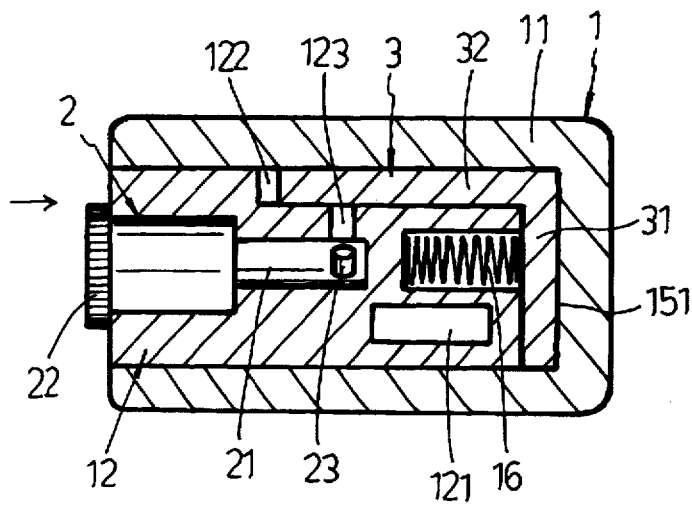
FIG. 6 is still another sectional view of the present invention, showing the button unlocked and depressed.

Referring to FIGS. 5 and 6, when the plug head 22 is turned with the key 4 in the reversed direction, the stop rod 23 is moved away from the longitudinal groove 122 toward one end of the transverse slot 123, the button 12 is unlocked and can be depressed to force down the control rod 13, and therefore the gear shift lever 1 is unlocked and can be operated.

Figure 7:
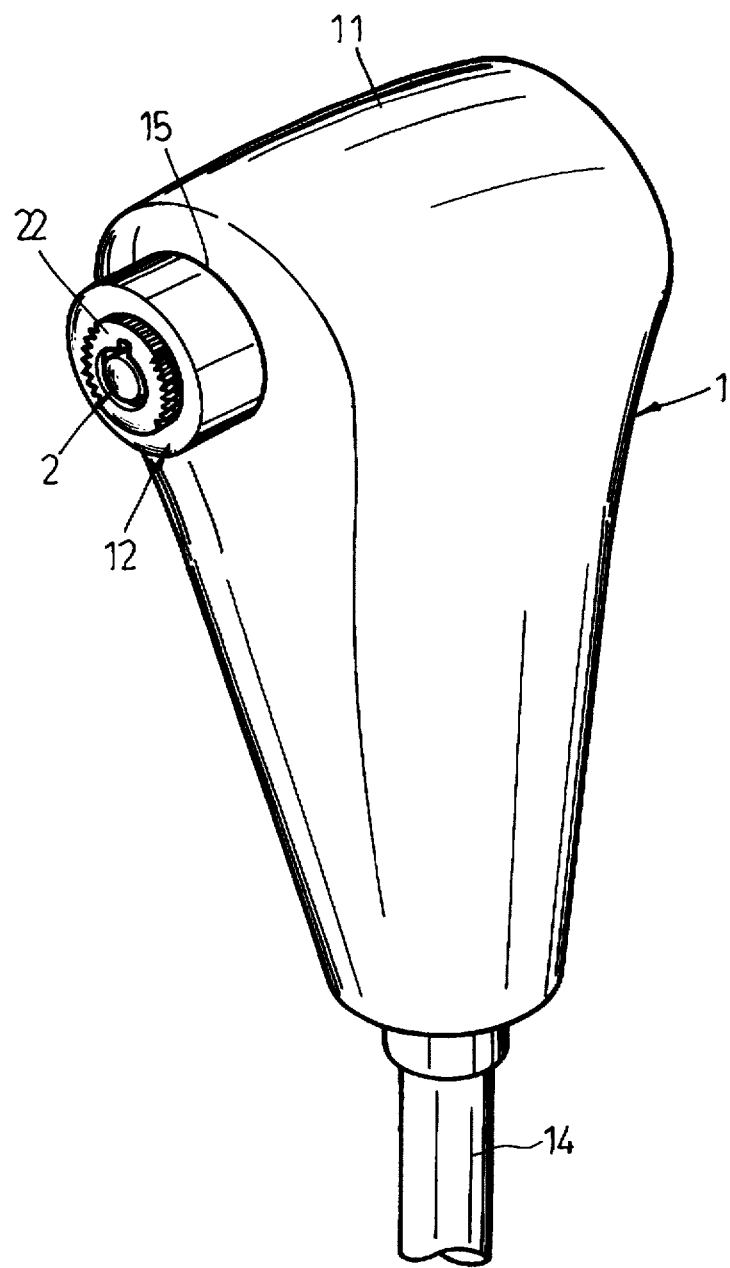
FIG. 7 shows an alternate form of the present invention.

Referring to FIG. 7, the recessed chamber 15 and the button 12 may be variously shaped, however the cross section of the button 12 must fits the cross section of the recessed chamber 15.

While only one embodiment of the present invention has been shown and described, it will be understood that various modifications and changes could be made thereunto without departing from the spirit and scope of the invention disclosed.

What the invention claimed is:

1. A gear shift lever comprising a lever body, a knob mounted on a top end of said lever body, said knob having a recessed chamber at one side, a control rod mounted in said lever body, a button mounted in said recessed chamber and depressed to force down said control rod for permitting said lever body to be shifted, and a button lock unit controlled to lock said button, wherein said button comprises a longitudinal groove and a transverse slot intersected with said longitudinal groove; said button lock unit comprises a stop member mounted inside said recessed chamber, said stop member comprising a base and a projecting rod forwardly and perpendicularly extended from said base, a spring connected between said base of the stop member and a rear end of said button and imparting an outward pressure to said button, the projecting rod of said stop member being inserted into the longitudinal groove of said button, a core mounted in an axial hole in said button, a plug head fixedly connected to one end of said core and disposed outside said button for turning with a key, and a stop rod fixedly and perpendicularly extended from one end of said core remote from said plug head and inserted into the transverse slot of said button, said stop rod being moved into the longitudinal groove of said button and stopped against the projecting rod of said stop member to lock said button when said plug head is turned with the key in one direction, said stop rod being moved away from the longitudinal groove of said button to unlock said button when said plug head is turned with the key in the reversed direction.

* * * * *